United States Patent
Bothe et al.

(10) Patent No.: US 8,038,014 B2
(45) Date of Patent: Oct. 18, 2011

(54) USE OF AN AQUEOUS POLYMER DISPERSION AS A BINDING AGENT FOR CELLULOSE FIBERS AND FOR THE PRODUCTION OF FILTER MATERIALS

(75) Inventors: Marc Bothe, Limburgerhof (DE);
Matthias Gerst, Neustadt (DE);
Matthias Laubender, Schifferstadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 659 days.

(21) Appl. No.: 11/814,642

(22) PCT Filed: Feb. 2, 2006

(86) PCT No.: PCT/EP2006/050630
§ 371 (c)(1),
(2), (4) Date: Jul. 24, 2007

(87) PCT Pub. No.: WO2006/082223
PCT Pub. Date: Aug. 10, 2006

(65) Prior Publication Data
US 2008/0142436 A1     Jun. 19, 2008

(30) Foreign Application Priority Data

Feb. 3, 2005  (DE) .......................... 10 2005 005 205

(51) Int. Cl.
*B01D 24/00*     (2006.01)
*B01D 39/00*     (2006.01)

(52) U.S. Cl. ........................................ 210/508; 210/504
(58) Field of Classification Search .................. 210/503, 210/504
See application file for complete search history.

(56) References Cited

U.S. PATENT DOCUMENTS

| | | | |
|---|---|---|---|
| 5,744,540 A * | 4/1998 | Baumstark et al. | 524/558 |
| 5,912,293 A * | 6/1999 | Stockwell et al. | 524/306 |
| 6,071,994 A | 6/2000 | Hummerich et al. | |
| 6,447,926 B2 * | 9/2002 | Schmidt-Thummes et al. | 428/514 |
| 6,841,608 B1 | 1/2005 | Dreher et al. | |
| 2001/0021459 A1 * | 9/2001 | Schmidt-Thummes et al. | 428/514 |
| 2002/0082319 A1 * | 6/2002 | Zhao et al. | 523/201 |

FOREIGN PATENT DOCUMENTS

| | | |
|---|---|---|
| DE | 199 49 592 A1 | 4/2001 |
| EP | 269059 A2 * | 6/1988 |
| EP | 0 445 578 A2 | 9/1991 |
| EP | 0 583 086 A1 | 2/1994 |
| EP | 0 885 906 A2 | 12/1998 |
| EP | 0 882 074 B1 | 10/1999 |
| GB | 1 278 813 | 6/1972 |
| WO | WO 97/31036 | 8/1997 |

* cited by examiner

Primary Examiner — Krishnan S Menon
Assistant Examiner — Katherine Zalasky
(74) *Attorney, Agent, or Firm* — Oblon, Spivak, McClelland, Maier & Neustadt, L.L.P.

(57) ABSTRACT

The present invention relates to the use of an aqueous polymer dispersion comprising methacrylic acid and N-methylolacrylamide as a binder for producing filter materials and for base paper for decorative sheets.

12 Claims, No Drawings

USE OF AN AQUEOUS POLYMER DISPERSION AS A BINDING AGENT FOR CELLULOSE FIBERS AND FOR THE PRODUCTION OF FILTER MATERIALS

The present invention relates to the use of an aqueous polymer dispersion comprising methacrylic acid and N-methylolacrylamide as binder for producing filter materials and for base paper for decorative sheets.

The invention further relates to decorative sheets and filter materials obtainable by the process.

The consolidation of sheetlike structures, exemplified by fiber webs or papers, or of shaped articles, such as fiberboard or chipboard, is frequently effected chemically using a polymeric binder. The polymeric binders may be used in forms including that of an aqueous solution or that of an aqueous dispersion.

EP-A445 578 discloses boards of finely divided materials, such as glass fibers, for example, in which mixtures of high molecular mass polycarboxylic acids and polyhydric alcohols, alkanolamines or polyfunctional amines act as binders.

Known from EP-A-583 086 are, for example, aqueous binders for producing fiber webs, especially glass fiber webs. The binders comprise a polycarboxylic acid having at least two carboxylic acid groups and also, if appropriate, anhydride groups and also a polyol. These binders require a phosphorus reaction accelerant in order to achieve sufficient strengths in the glass fiber webs. It is noted that the presence of such a reaction accelerant is vital unless a highly reactive polyol is used. As highly reactive polyols mention is made of β-hydroxyalkylamides.

EP-A 882 074 describes binders for shaped articles that are composed of a polymer obtained by free-radical polymerization from an unsaturated acid anhydride or unsaturated dicarboxylic acid and of an alkanolamine. Binders of this kind are applied, as well as to other substrates, to fiber webs which serve as support materials in coating operations.

DE-A 19949592 relates to aqueous polymer solutions comprising dissolved polymer particles of at least one polymer of ethylenically unsaturated carboxylic acids and esters of unsaturated carboxylic acids, and also further monomers. Aqueous polymer solutions of this kind are likewise employed as, among other things, binders for fiber webs, such as those of cellulose, for example.

EP-A 882 074 and DE-A 19949592 do not disclose, moreover, the use of such aqueous solutions or of such aqueous polymer dispersions, respectively, as binders for producing filter materials.

Binders for filter materials such as filter papers or filter cloths, for example, must give the substrate, among other qualities, a high mechanical stability (tensile strength, bursting strength), particularly after storage under humid conditions and at elevated temperature. In addition, binders of this kind are required to ensure high chemical resistance, under the action of solvents for example, and ought to have very little if any influence on the permeability (pore size) of the filter material.

In filter material production, binders having a very high proportion of acid groups have occasionally been found to date to be deleterious, since filter materials consolidated with such binders and based on cellulose fibers sometimes have a reduced service stability, which is manifested, inter alia, in a reduced bursting strength in long-term testing or after storage at elevated temperature.

It was therefore an object of the present invention to remedy the disadvantages outlined and to provide an improved binder for filter materials and base paper for decorative sheets that is notable, among other things, for high mechanical stability and chemical resistance and that as far as possible has no effect on the permeability of the filter materials. The present invention also extends, furthermore, to the decorative sheets and filter materials provided with the improved binders.

This object has been achieved in accordance with the invention through the use of an aqueous polymer dispersion obtainable by free-radical emulsion polymerization comprising a) 0.1-5% by weight of methacrylic acid
b) 1-10% by weight of methyl methacrylate
c) 0.14% by weight of N-methylolacrylamide
d) 30-98.8% by weight of principal monomers M
e) 0-20% by weight of monomers other than a-d as binders for producing filter materials and for base paper for decorative sheets.

The invention further provides filter materials and decorative sheets comprising the polymer dispersion of the invention, and a process for coating the filter materials or decorative sheets.

The invention additionally provides an emulsion polymer comprising a) 0.5-1.5% by weight of methacrylic acid
b) 2-8% by weight of methyl methacrylate
c) 2-3% by weight of N-methylolacrylamide
d) 20-50% by weight of n-butyl acrylate and 45-65% by weight of styrene and, if appropriate
e) 0.1-1% by weight of acrylic acid.

The dispersions of the invention are notable for good methanol compatibility.

The aqueous polymer dispersion used in accordance with the invention preferably comprises 0.1 to 5% by weight of methacrylic acid, more preferably 0.5 to 1.5% by weight of methacrylic acid.

The fraction of methyl methacrylate is 1% to 10% by weight, preferably 2% to 8% by weight. Additionally the polymer comprises 0.1 to 4% by weight of N-methylol-acrylamide, preferably 0.5% to 3% by weight, and very preferably 2-3% by weight.

As well as these, the polymer comprises the principal monomers M.

The principal monomers M are selected from $C_1$-$C_{20}$ alkyl (meth)acrylates, vinyl esters of carboxylic acids comprising up to 20 carbon atoms, vinylaromatics having up to 20 carbon atoms, ethylenically unsaturated nitriles, vinyl halides, vinyl ethers of alcohols comprising 1 to 10 carbon atoms, aliphatic hydrocarbons having 2 to 8 carbon atoms and 1 or 2 double bonds, or from mixtures thereof.

Examples include (meth)acrylic acid alkyl esters having a $C_1$-$C_{10}$ alkyl radical, such as methyl methacrylate, methyl acrylate, n-butyl acrylate, ethyl acrylate, and 2-ethylhexyl acrylate.

Also suitable are mixtures of the (meth)acrylic acid alkyl esters.

Vinyl esters of carboxylic acids having 1 to 20 carbon atoms are, for example, vinyl laurate, vinyl stearate, vinyl propionate, Versatic acid vinyl esters, and vinyl acetate.

Suitable vinylaromatic compounds include vinyltoluene, α- and p-methylstyrene, α-butylstyrene, 4-n-butylstyrene, 4-n-decylstyrene, and, preferably, styrene.

Examples of nitriles are acrylonitrile and methacrylonitrile.

The vinyl halides are chloro-, fluoro- or bromo-substituted ethylenically unsaturated compounds.

Examples of vinyl ethers include vinyl methyl ether and vinyl isobutyl ether. Preference is given to using vinyl ethers with alcohols comprising 1 to 4 carbon atoms.

As hydrocarbons having 2 to 8 carbon atoms and two olefinic double bonds mention may be made of butadiene, isoprene, and chloroprene; those having one double bond are, for example, ethene or propene.

Preferred principal monomers are acrylic acid alkyl esters, styrene, and, in particular, mixtures of styrene and acrylic acid alkyl esters, particularly of styrene and n-butyl acrylate.

Besides these principal monomers the polymer may comprise further monomers, e.g., hydroxyl-comprising monomers, especially C1-C10 hydroxyalkyl (meth)acrylates, carboxylic acids, dicarboxylic acids and their anhydrides or monoesters, e.g., acrylic acid, maleic acid, fumaric acid, maleic anhydride, as constituents.

Preferred polymers are, for example, those synthesized from
a) 0.5-1.5% by weight of methacrylic acid
b) 2-8% by weight of methyl methacrylate
c) 2-3% by weight of N-methylolacrylamide
d) 20-50% by weight of n-butyl acrylate and 45-65% by weight of styrene and, if appropriate,
e) 0.1-1% by weight of acrylic acid.

The aqueous dispersion is prepared preferably by emulsion polymerization; the polymer is therefore an emulsion polymer.

Generally speaking, in the course of the emulsion polymerization, ionic and/or nonionic emulsifiers and/or protective colloids or stabilizers are used as surface-active compounds.

An exhaustive description of suitable protective colloids is found in Houben-Weyl, Methoden der organischen Chemie, volume XIV/1, Makromolekulare Stoffe [Macrol-molecular compounds], Georg-Thieme-Verlag, Stuttgart, 1961, pp. 411 to 420. Suitable emulsifiers include anionic, cationic, and nonionic emulsifiers. As accompanying surface-active substances it is preferred to use exclusively emulsifiers, whose molecular weights, in contradistinction to the protective colloids, are usually situated below 2000 g/mol. Where mixtures of surface-active substances are used the individual components must of course be compatible with one another, something which in case of doubt can be ascertained by means of a few preliminary tests. It is preferred to use anionic and nonionic emulsifiers as surface-active substances. Customary accompanying emulsifiers are, for example, ethoxylated fatty alcohols (EO units: 3 to 50, alkyl radical; $C_8$- to $C_{36}$), ethoxylated mono-, di- and tri-alkylphenols (EO units: 3 to 50, alkyl radical: ($C_4$- to $C_9$), alkali metal salts of dialkyl esters of sulfosuccinic acid and also alkali metal salts and ammonium salts of alkyl sulfates (alkyl radical: $C_8$- to $C_{12}$), of ethoxylated alkanols (EO units: 4 to 30, alkyl radical: $C_{12}$- to $C_{18}$), of ethoxylated alkylphenols (EO units: 3 to 50, alkyl radical: $C_4$ to $C_9$), of alkylsulfonic acids (alkyl radical: $C_{12}$- to $C_{18}$), and of alkylarylsulfonic acids (alkyl radical: $C_9$- to $C_{18}$).

Suitable emulsifiers are also found in Houben-Weyl, Methoden der organischen Chemie, volume 14/1, Makromolekulare Stoffe, Georg Thieme Verlag, Stuttgart, 1961, pages 192 to 208.

Emulsifier trade names are, for example, Dowfax® 2 A1, Emulan® NP 50, Dextrol® OC 50, Emulgator 825, Emulgator 825 S, Emulan® OG, Texapon® NSO, Nekanil® 904 S, Lumiten® I-RA, and Lumiten E 3065 etc.

The surface-active substance is used usually in amounts of 0.1% to 10% by weight, based on all monomers to be polymerized.

Examples of water-soluble initiators for the emulsion polymerization are ammonium salts and alkali metal salts of peroxydisulfuric acid, e.g., sodium peroxodisulfate, hydrogen peroxide, or organic peroxides, e.g., tert-butyl hydroperoxide.

Particular suitability is possessed by what are known as reduction-oxidation (redox) initiators systems.

The redox initiator systems are composed of at least one, usually inorganic, reducing agent and one organic or inorganic oxidizing agent.

The oxidizing component comprises, for example, the emulsion polymerization initiators already mentioned above.

The reducing components comprise, for example, alkali metal salts of sulfurous acid, such as sodium sulfite, sodium hydrogen sulfite, alkali metal salts of disulfurous acid such as sodium disulfite, bisulfite addition compounds with aliphatic aldehydes and ketones, such as acetone bisulfite, or reducing agents such as hydroxymethanesulfinic acid and its salts, or ascorbic acid. The redox initiator systems can be used along with soluble metal compounds whose metallic component is able to exist in a plurality of valence states.

Examples of customary redox initiator systems include ascorbic acid/iron(II) sulfate/sodium peroxydisulfate, tert-butyl hydroperoxide/sodium disulfite, tert-butyl hydroperoxide/Na hydroxymethanesulfinic acid. The individual components, the reducing component for example, may also be mixtures: for example a mixture of the sodium salt of hydroxymethanesulfinic acid and sodium disulfite.

The stated compounds are used mostly in the form of aqueous solutions, the lower concentration being determined by the amount of water that is acceptable in the dispersion and the upper concentration being determined by the solubility of the respective compound in water.

In general the concentration is 0.1% to 30%, preferably 0.5% to 2.0%, more preferably 1.0% to 10%, by weight, based on the solution.

The amount of initiators is generally 0.1 to 10% by weight, generally 0.2% to 5% by weight, based on all the monomers to be polymerized. It is also possible for two or more different initiators to be used for the emulsion polymerization.

The emulsion polymerization takes place in general at 30 to 150° C., preferably 50 to 90° C. The polymerization medium may be composed either of water alone or of mixtures of water and water-miscible liquids such as methanol. Preferably just water is used. The emulsion polymerization may be carried out either as a batch operation or in the form of a feed process, including staged or gradient procedures. Preference is given to the feed process, in which a portion of the polymerization mixture or else a polymer seed is introduced as an initial charged, heated to the polymerization temperature, and subjected to initial polymerization, and then the remainder of the polymerization mixture, usually by way of two or more spatially separate feed streams, of which one or more comprise the monomers in pure form or in emulsified form, is added continuously, in stages or under a concentration gradient to the polymerization zone, during which addition the polymerization is maintained.

The manner in which the initiator is added to the polymerization vessel in the course of the free-radical aqueous emulsion polymerization is known to the skilled worker. It can either be included in its entirety in the initial charge to the polymerization vessel or else introduced continuously or in stages at the rate at which it is consumed in the course of the free-radical aqueous emulsion polymerization. In each individual case this will depend, in a manner known to the skilled worker, both on the chemical nature of the initiator system and on the polymerization temperature. It is preferred to include one portion in the initial charge and to supply the remainder to the polymerization zone in accordance with the rate of its consumption.

To remove the residual monomers it is common to add initiator after the end of the emulsion polymerization proper as well, in other words after a monomer conversion of at least 95%.

In many cases, in the aqueous polymer dispersions that are obtained, the residual amounts of unreactive monomers and other low-boiling compounds are lowered by means of chemical and/or physical methods that are likewise known to the skilled worker [see, for example, EP-A 771328, DE-A 19624299, DE-A 19621027, DE-A 19741184, DE-A 19741187, DE-A 19805122, DE-A 19828183, DE-A 19839199, DE-A 19840586, and 19847115].

In the case of the emulsion polymerization an aqueous dispersion of a polymer is obtained.

In order to prepare polymers of low average molecular weight it is often advantageous to carry out the copolymerization in the presence of regulators. For this purpose it is possible to use customary regulators, such as, for example, organic compounds containing SH groups, such as 2-mercaptoethanol, 2-mercaptopropanol, mercaptoacetic acid, tert-butyl mercaptan, n-octyl mercaptan, n-dodecyl mercaptan and tert-dodecyl mercaptan, hydroxylammonium salts such as hydroxylammonium sulfate, formic acid, sodium bisulfite or isopropanol. The polymerization regulators are used generally in amounts of 0.05% to 5% by weight, based on the monomers.

In order to prepare copolymers of higher molecular mass it is often advantageous to operate, during the polymerization, in the presence of crosslinkers. Such crosslinkers are compounds having two or more ethylenically unsaturated groups, such as diacrylates or dimethacrylates of at least dihydric saturated alcohols, examples being ethylene glycol diacrylate, ethylene glycol dimethacrylate, 1,2-propylene glycol diacrylate, 1,2-propylene glycol dimethacrylate, butane-1,4-diol diacrylate, butane-1,4-diol dimethacrylate, hexanediol diacrylate, hexanediol dimethacrylate, neopentyl glycol diacrylate, neopentyl glycol dimethacrylate, 3-methylpentanediol diacrylate, and 3-methylpentanediol dimethacrylate. Additionally the acrylic and methacrylic esters of alcohols having more than 2 OH groups can be used as crosslinkers, e.g., trimethylolpropane triacrylate or trimethylolpropane trimethacrylate. A further class of crosslinkers encompasses diacrylates or dimethacrylates of polyethylene glycols or polypropylene glycols having molecular weights of in each case 200 to 9000.

Aside from the homopolymers of ethylene oxide or propylene oxide it is also possible to use block copolymers of ethylene oxide and propylene oxide or copolymers of ethylene oxide and propylene oxide comprising the ethylene oxide and propylene oxide units distributed randomly. The oligomers of ethylene oxide or propylene oxide are also suitable for preparing the crosslinkers, examples being diethylene glycol diacrylate, diethylene glycol dimethacrylate, triethylene glycol diacrylate, triethylene glycol dimethacrylate, tetraethylene glycol diacrylate and/or tetraethylene glycol dimethacrylate.

Further suitable crosslinkers include vinyl acrylate, vinyl methacrylate, vinyl itaconate, divinyl adipate, butanediol divinyl ether, trimethylolpropane trivinyl ether, allyl acrylate, allyl methacrylate, pentaerythritol triallyl ether, triallylsucrose, pentaallyisucrose, pentaallylsucrose, methylenebis (meth)acrylamide, divinylethyleneurea, divinylpropyleneurea, divinylbenzene, divinyidioxane, triallyl cyanurate, tetraallylsilane, tetravinylsilane, and bis- or polyacrylosiloxanes (e.g., Tegomers® from Th. Goldschmidt AG). The crosslinkers are used preferably in amounts of 10 ppm to 5% by weight, based on the monomers to be polymerized.

As crosslinking accelerants use may be made, among others, of phosphorus compounds, especially phosphorous and hypophosphorous acids and their salts.

As well as the constituents specified the aqueous polymer dispersions may comprise customary additions in accordance with the intended application.

The components comprised additionally, if appropriate, in the aqueous polymer dispersion are normally added after the end of the emulsion polymerization.

To modify various property features of the aqueous polymer dispersions for use in accordance with the invention said dispersions may also be mixed with one or more other polymer dispersions, polymer solutions or polymer powders.

A further possibility for modification is the admixing of further mixing components, including organic components such as, for example, epoxy-functional components, formaldehyde resins, components containing isocyanate or urethane groups, amine, carboxy- or hydroxy-functionalized mono- or disilane and/or -siloxane compounds, or other substituted or unsubstituted hydrocarbon compounds.

It is also possible, furthermore, to add inorganic components to the aqueous polymer dispersions (fillers, rheological additives, adhesion promoters, crosslinking accelerants, etc.). Examples deserving of mention include pigments, fillers, salts, and oxides.

The polymer dispersions for use in accordance with the invention may where necessary also comprise two or more of the aforementioned mixing components at one and the same time.

The aqueous polymer dispersions may further comprise customary additions in accordance with the intended application. By way of example they may comprise bactericides or fungicides. Over and above these they may comprise water repellents for increasing the water resistance of the treated substrates. Suitable water repellents are customary aqueous paraffin dispersions or silicones. The compositions may further comprise wetting agents, thickeners, plasticizers, retention agents, pigments, and fillers. One way in which these fillers can be mixed is by induction heating, which facilitates the curing process.

In addition to this it may be advisable, for more rapid crosslinking at lower temperatures, to add certain epoxide compounds as well, examples being difunctional or trifunctional glycidyl ethers such as bisphenol A diglycidyl ether or butanediol diglycidyl ether, i.e., in particular, aromatic and aliphatic glycidyl ethers. Suitable epoxide compounds, furthermore, are cycloaliphatic glycidyl compounds, heterocyclic glycidyl compounds, and cycloaliphatic epoxy resins.

The aqueous polymer dispersions may finally comprise customary flame retardants, such as aluminum silicates, aluminum hydroxides, borates and/or phosphates, for example.

Frequently the aqueous polymer dispersions also comprise coupling reagents, such as alkoxysilanes, 3-aminopropyltriethoxysilane for example, soluble or emulsifiable oils as lubricants and dust binders, and also wetting assistants.

The aqueous polymer dispersions can also be used as a blend with other binders, such as urea-formaldehyde resins, melamine-formaldehyde resins or phenol-formaldehyde resins, with epoxy resins, and also with mixtures of solution polymers, e.g., with binders of the trade mark Acrodur®, from BASF Aktiengesellschaft. These binders are used frequently in methanolic solution. A decisive advantage of the dispersions of the invention is the good methanol stability, which prevents occurrence of unwanted coagulum.

The aqueous polymer dispersions for use in accordance with the invention are finely divided, stable latices. The weight-average particle size of the latex particles is approximately 10 to 1500 nm, preferably 20 to 1000 nm, more preferably 30 to 500 nm, measured by means of an analytical ultracentrifuge (AUC).

The aqueous polymer dispersions for use in accordance with the invention are infinitely dilutable with water or dilute salt solutions or surfactant solutions, without coagulation of the latex particles. They have a nonvolatiles content (solids content) in the range from about 20% to 75%, preferably 250% to 65% by weight. The viscosity (at a solids content of 40% by weight) is generally within a range from about 10 to 4000 mPas, measured with a rotational viscometer in accordance with DIN 53019 at 23° C. and at a shear rate of 250 $s^{-1}$.

The aqueous polymer dispersions for use in accordance with the invention can also be diluted with water before being added to the filter material. It may further be advantageous to apply the aqueous polymer dispersions as a blend with water-compatible solvents such as, for example, alcohols, in particular methanol, ethanol or the like. The aqueous polymer dispersions exhibit in particular a high compatibility for these solvents. Application from the aqueous phase, however, constitutes a further advantage of the binder dispersion of the invention over solvent-containing systems.

The aqueous polymer dispersions described are used in accordance with the invention as binders for producing filter materials, particularly filter papers or filter cloths. Examples of possible cloth materials include cellulose, cotton, polyester, polyamide, PE, PP, glass nonwovens, and glass wool. It can be advisable to adjust the aqueous polymer dispersions to a pH of 2 to 8, in particular of 3.0 to 6.5, before applying them to the corresponding paper or cloth, by adding various organic or inorganic bases. Suitable bases include triethanolamine, diethanolamine, monoethanolamine, hydroxyalkylamines, ammonia, organic monofunctional or polyfunctional amines, alkoxides, and metal alkyl compounds, and also inorganic bases such as sodium or potassium hydroxide solutions. The adjustment of the pH to the stated range of values has the effect, among others, of reducing the falling bursting strength following storage or thermal exposure and hence of achieving a high thermal stability.

Application of the polymer dispersion for inventive use to the filter materials, i.e., to filter paper or filter cloth, inter alia, is accomplished preferably by the impregnating method or by spraying. In this case the aqueous polymer dispersions, usually in a form in which they have been diluted with water or methanol, are applied to the filter materials by resination. After the filter materials have been resinated with the aqueous polymer dispersions it is advisable to cure them by heating at temperatures from 100 to 250° C., in particular from 110 to 220° C., for 0.1 to 60 minutes, in particular 1 to 60 minutes.

The inventive use of the aqueous polymer dispersion as a binder for filter materials means that the treated filter materials have, among other qualities, an enhanced mechanical stability (higher tensile strength and bursting strength), especially after storage under damp conditions and at elevated temperature. The inventive use of the aqueous binders also has the effect that the resultant filter materials are characterized by qualities including high chemical resistance, to solvents for example, without any effect on the permeability (pore size) of the filter material. Through the use of the aqueous polymer dispersions it is also observed that they give the filter materials a high strength even after drying (dry tensile strength), and yet after drying below the curing temperature of the aqueous polymer dispersions the filter materials can still be readily subjected to deformation by folding, grooving or pleating. Following subsequent thermal curing (heat treatment) the polymer dispersions give the resultant and likewise inventive filter materials, primarily filter papers or filter cloths, a high dimensional stability. This quality makes it possible to produce semifinished products and so to break down the manufacturing operation into individual, independent production steps.

A further application of the polymer dispersions of the invention is their use for impregnating base papers or fiber webs, and also the use of the impregnated base papers for producing decorative sheets.

Chipboard is often coated with decorative sheets and used in this way to produce furniture. Decorative sheets are composed essentially of an impregnated base paper which has been printed with a printing ink and so has the desired appearance, and which is generally coated with a protective overcoat of a formaldehyde resin.

The performance properties of the decorative sheet are critically determined by the impregnated base paper. The impregnation of the base paper ought in particular to increase the base paper's strength, provide high compatibility with the printing ink and protective overcoat, and in particular produce effective cohesion of the layers in the decorative sheet.

The polymer dispersion used in accordance with the invention may be admixed prior to impregnation with additives, such as defoamers, fixatives, flow control agents, dyes, fillers or thickeners.

Suitable base paper includes customary fiber pulps consolidated, for example, by means of a size to form a base paper. Base papers have not been coated with a paper coating slip.

Impregnation takes place generally in an impregnating unit, in which the base paper or fiber web is contacted with the aqueous polymer dispersion on one side or, preferably, on both sides. Impregnation is preferably accomplished by dipping into the aqueous dispersion. Following impregnation, the base paper is generally dried, preferably at temperatures of 100 to 180° C.

The impregnated base paper can be used for producing decorative papers. Decorative papers find use for coating furniture or furniture components, and in this context are also referred to as decorative furniture foils.

The polymer dispersion used in accordance with the invention for impregnating exhibits effective penetration characteristics substantially irrespective of the particle size of the dispersed polymer particles. The papers impregnated with the polymer dispersion of the invention have good performance properties, one example being a high tensile strength.

EXAMPLES

The solids contents were generally determined by drying a defined amount of the aqueous polymer dispersion (about 5 g) to constant weight at 140° C. in a drying cabinet. Two separate measurements were carried out in each case. The value reported in the respective examples represents the average of the two measurement results.

The average particle diameter of the copolymer particles was determined generally by means of dynamic light scattering on an aqueous dispersion at 0.005 to 0.01 percent by weight at 23° C. using an Autosizer IIC from Malvern Instruments, UK. The parameter reported is the average diameter of the cumulant evaluation (cumulant z-average) of the measured autocorrelation function (ISO standard 13321).

Example 1

In a 3-l polymerization reactor with blade stirrer and heating/cooling means a mixture of 564.2 g of deionized water and 15.36 g of a 33% by weight aqueous polymer latex (prepared by free-radically initiated emulsion polymerization of styrene) having a weight-average particle diameter $Dw_{50}$ of 30 nm was heated to 93° C. under a nitrogen atmosphere. At this temperature 18.55 g of a 7% strength by weight aqueous solution of sodium peroxodisulfate were added. After 5 minutes, feed streams 1 and 2 were started and metered in at a uniform rate over 2 h.

Feed stream 1 was an aqueous emulsion prepared from
520.0 g of deionized water
27.86 g of a 28% strength by weight aqueous solution of sodium lauryl ether sulfate
(sodium salts of the sulfuric monoesters of ethoxylated lauryl alcohols, with a degree of ethoxylation of 3 to 5)
43.33 g of a 3% strength by weight aqueous solution of sodium pyrophosphate
9.75 g of methacrylic acid
54.17 g of a 48% strength by weight aqueous solution of N-methylolacrylamide
65.0 g of methyl methacrylate
702.0 g of styrene
497.3 g of n-butyl acrylate.

Feed stream 2 comprised 50.17 g of a 7% strength by weight aqueous solution of sodium peroxodisulfate.

After the end of feed streams 1 and 2 the internal temperature of the reactor was lowered to 90° C. Thereafter feed streams 3 and 4 were started and were metered in at a uniform rate over 90 minutes.

Feed stream 3 was a 10% strength by weight aqueous solution of tert-butyl hydroperoxide.

Feed stream 4 was a 13.3% strength by weight aqueous solution of acetone bisulfite.

After the end of feed streams 3 and 4 the internal temperature of the reaction was lowered to 25° C. Thereafter 0.52 g of a 25% strength by weight aqueous solution of ammonia was added.

The aqueous polymer dispersion obtained had a solids content of 50.2% by weight.

The average particle size was 193 nm.

Comparative Example 1

A dispersion was prepared in accordance with the instructions of Example 1, with the difference that feed stream 1 comprised no methyl methacrylate and 767.0 g of styrene. The aqueous polymer dispersion obtained had a solids content of 49.9% by weight. The average particle size was 195 nm.

Comparative Example 2

A dispersion was prepared in accordance with the instructions of Example 1, with the difference that feed stream 1 comprised 26.0 g of methacrylic acid and 685.75 g of styrene. The aqueous polymer dispersion obtained had a solids content of 49.8% by weight. The average particle size was 192 nm.

Comparative Example 3

A dispersion was prepared in accordance with the instructions of Example 1, with the difference that feed stream 1 comprised 429.0 g of deionized water, no N-methylolacrylamide and 173.33 g of a 15% strength by weight aqueous solution of N-methylolmethacrylamide.
The aqueous polymer dispersion obtained had a solids content of 50.6% by weight. The average particle size was 196 nm.

Comparative Example 4

A dispersion was prepared in accordance with the instructions of Example 1, with the difference that feed stream 1 comprised no methacrylic acid and 9.75 g of acrylic acid. The aqueous polymer dispersion obtained had a solids content of 50.0% by weight. The average particle size was 209 nm.

Comparative Example 5

A dispersion was prepared in accordance with the instructions of Example 1, with the difference that feed stream 1 comprised no methacrylic acid and 711.75 g of styrene. The aqueous polymer dispersion obtained had a solids content of 50.2% by weight. The average particle size was 210 nm.

Comparative Example 6

A dispersion was prepared in accordance with the instructions of Example 1, with the difference that feed stream 1 comprised 507.0 g of deionized water, 81.25 g of a 48% strength by weight aqueous solution of N-methylolacrylamide and 689.0 g styrene. The aqueous polymer dispersion obtained had a solids content of 50.1% by weight. The average particle size was 226 nm.

Comparative Example 7

A dispersion was prepared in accordance with the instructions of Example 1, with the difference that feed stream 1 comprised 546.0 g of deionized water, no N-methylolacrylamide and 728.0 g of styrene.

The aqueous polymer dispersion obtained had a solids content of 49.6% by weight. The average particle size was 206 nm.

Performance Tests

The methanol-dilutability of the dispersions was tested by introducing 5 ml of dispersion dropwise into 10 ml of a mixture of 90% by weight methanol and 10% by weight deionized water. After storage for 30 minutes the dilute dispersion was examined for sediment.

The viscosity of the dispersions was determined in a Rheomat Z 2 from Physica at a shear rate of 100 s-1 in accordance with DIN 53019 at 23° C.

TABLE 1

| | Difference from inventive composition | Methanol-dilutability | Viscosity [mPa * s] at 100 s$^{-1}$ |
|---|---|---|---|
| Example 1 | — | no sediment | 40 |
| Comparative Example 1 | no methyl methacrylate | sediment | 40 |
| Comparative Example 2 | >1.5% by weight methacrylic acid | no sediment | 35 |
| Comparative Example 3 | no N-methylolacrylamide | sediment | 30 |
| Comparative Example 4 | no methacrylic acid | sediment | 80 |
| Comparative Example 5 | no methacrylic acid | sediment | 40 |
| Comparative Example 6 | >3.0% by weight N-methylolacrylamide | no sediment | 90 |
| Comparative Example 7 | no N-methylolacrylamide | sediment | 20 |

The polymer dispersions were used to resinate filter papers in an impregnating method. The liquor was prepared by diluting the dispersions with water to 15% by weight solids content. The paper grade was 105 g/m$^2$, the application weight 25% by weight. The impregnated filter papers were dried at 180° C. for 3 minutes. Testing took place after 24-hour conditioning at 23° C. and 50% relative humidity. The bursting pressure was determined in accordance with ISO 2758. The air permeability was determined by means of an Akustron instrument from W. Westerteiger along the lines of DIN 53887 and DIN 53120 and ISO 9237.

TABLE 2

|  | Difference from inventive composition | Bursting pressure [kPa] at 23° C. and 50% rel. humidity | Air permeability [l/(m² * s)] at 23° C. and 50% rel. humidity |
| --- | --- | --- | --- |
| Example 1 | — | 450 | 800 |
| Comparative Example 1 | no methyl methacrylate | 420 | 760 |
| Comparative Example 2 | >1.5% by weight methacrylic acid | 390 | 800 |
| Comparative Example 3 | no N-methylolacrylamide | 410 | 760 |
| Comparative Example 4 | no methacrylic acid | 420 | 760 |
| Comparative Example 5 | no methacrylic acid | 415 | 770 |
| Comparative Example 6 | >3.0% by weight N-methylolacrylamide | 430 | 750 |
| Comparative Example 7 | no N-methylolacrylamide | 370 | 820 |

The invention claimed is:

1. A process for impregnating or coating base paper or filter material comprising resinating by impregnating the paper or the filter material with an aqueous polymer dispersion obtainable by free-radical emulsion polymerization, wherein the polymer of said aqueous polymer dispersion is comprised of monomer units as follows:
   a) 0.1-5% by weight of methacrylic acid,
   c) 0.1-4% by weight of N-methylolacrylamide,
   d) 30-98.8% by weight of principal monomers M, and
   e) 0-20% by weight of monomers other than a, c-d
   wherein said polymer comprise 1-10% by weight of methyl methacrylate
   wherein the principal monomers M are selected from the group consisting of $C_1$-$C_{20}$ alkyl (meth)acrylates, vinyl esters of carboxylic acids comprising up to 20 carbon atoms, vinylaromatics having up to 20 carbon atoms, ethylenically un-saturated nitriles, vinyl halides, vinyl ethers of alcohols comprising 1 to 10 carbon atoms, aliphatic hydrocarbons having 2 to 8 carbon atoms and 1 or 2 double bonds, and mixtures thereof.

2. A filter material comprising as a binder an aqueous polymer dispersion according to claim 1.

3. A decorative sheet comprising as a binder an aqueous polymer dispersion according to claim 1.

4. An emulsion polymer comprising monomer units of
   a) 0.5-1.5% by weight of methacrylic acid,
   b) 2-8% by weight of methyl methacrylate,
   c) 2-3% by weight of N-methylolacrylamide,
   d) 20-50% by weight of n-butyl acrylate and 45-65% by weight of styrene.

5. The process of claim 1, wherein the aqueous polymer dispersion is adjusted by addition of organic or inorganic bases to the pH of 2 to 8.

6. The process of claim 1, wherein 0.5 to 1.5% by weight of methacrylic acid is used.

7. The process of claim 1, wherein the fraction of methyl methacrylate is 2 to 8% by weight.

8. The process of claim 1, wherein the fraction of N-methylolacrylamide is 2-3% by weight.

9. The process of claim 1, wherein the principal monomers M comprise styrene and n-butyl acrylate.

10. The emulsion polymer of claim 4, wherein the aqueous polymer dispersion is adjusted by addition of organic or inorganic bases to a pH of 2 to 8.

11. The emulsion polymer of claim 4 further comprising e) 0.1 to 1% by weight of acrylic acid.

12. The process of claim 1, wherein said aqueous polymer dispersion is comprised of monomer units as follows:
   a) 0.5-1.5% by weight of methacrylic acid,
   b) 2-8% by weight of methyl methacrylate,
   c) 2-3% by weight of N-methylolacrylamide,
   d) 20-50% by weight of n-butyl acrylate and 45-65% by weight of styrene.

* * * * *